(12) United States Patent
Jurik et al.

(10) Patent No.: US 11,774,075 B2
(45) Date of Patent: Oct. 3, 2023

(54) ABSOLUTE POSITION SENSING SYSTEM FOR STEPPER MOTOR MECHANISM

(71) Applicant: Robe Lighting s.r.o., Roznov pod Radhostem (CZ)

(72) Inventors: Pavel Jurik, Prostredni Becva (CZ); Jindrich Vavrik, Zubri (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 17/710,271

(22) Filed: Mar. 31, 2022

(65) Prior Publication Data

US 2022/0221139 A1 Jul. 14, 2022

Related U.S. Application Data

(60) Provisional application No. 63/168,913, filed on Mar. 31, 2021.

(51) Int. Cl.
*F21V 21/15* (2006.01)
*F21V 14/06* (2006.01)
(Continued)

(52) U.S. Cl.
CPC .............. *F21V 21/15* (2013.01); *F21V 14/06* (2013.01); *H02P 8/22* (2013.01);
(Continued)

(58) Field of Classification Search
CPC ...... H02P 8/22; H02P 1/00; H02P 8/24; H02P 2203/00; H02P 2201/00; F21V 21/00
See application file for complete search history.

(56) References Cited

U.S. PATENT DOCUMENTS

| 5,900,930 | A | 5/1999 | Simon et al. |
| 7,654,693 | B2 * | 2/2010 | Rasmussen et al. ..... G01D 5/04 362/419 |

(Continued)

OTHER PUBLICATIONS

European Extended Search Report; Application No. 22165390.0; dated Sep. 9, 2022; 9 pages.

*Primary Examiner* — Said Bouziane
(74) *Attorney, Agent, or Firm* — Conley Rose, P.C.; Brooks W Taylor

(57) ABSTRACT

A luminaire includes a luminaire mechanism, a stepper motor, an absolute multi-turn rotational position sensing system, and a control system. The stepper motor moves the luminaire mechanism. The absolute multi-turn rotational position sensing system includes absolute rotational sensors that detect absolute positions of a cam indexer on the motor shaft and an indexer wheel coupled to the cam indexer. The indexer wheel rotates by a predetermined amount in response to one full rotation of the cam indexer. The control system determines an absolute position of the luminaire mechanism based on information from the absolute rotational sensors relating to the positions of the cam indexer and the indexer wheel. The control system receives a commanded position for the luminaire mechanism and causes the stepper motor to move the luminaire mechanism to the commanded position based on the absolute position of the luminaire mechanism.

19 Claims, 9 Drawing Sheets

(51) Int. Cl.
  *H02P 8/22* (2006.01)
  *F21W 131/406* (2006.01)
  *H02P 8/40* (2006.01)
  *H02P 8/34* (2006.01)

(52) U.S. Cl.
  CPC ......... *F21W 2131/406* (2013.01); *H02P 8/34* (2013.01); *H02P 8/40* (2013.01)

(56) References Cited

U.S. PATENT DOCUMENTS 10,222,233 B2 * 3/2019 Rodger .................. H02K 7/116
10,274,175 B1 * 4/2019 Wood et al. ........... G01D 5/145

* cited by examiner

ABSOLUTE POSITION SENSING SYSTEM FOR STEPPER MOTOR MECHANISM

CROSS-REFERENCE TO RELATED APPLICATIONS

This application claims priority to U.S. Provisional Application No. 63/168,913 filed Mar. 31, 2021 by Pavel Juřík, et al. entitled, "Absolute Position Sensing System for Stepper Motor Mechanism", which is incorporated by reference herein as if reproduced in its entirety.

TECHNICAL FIELD OF THE DISCLOSURE

The disclosure generally relates to automated luminaires, and more specifically to a method for sensing an absolute position of stepper motors controlling functions of an automated luminaire.

BACKGROUND

Luminaires with automated and remotely controllable functionality (referred to as automated luminaires) are well known in the entertainment and architectural lighting markets. Such products are commonly used in theatres, television studios, concerts, theme parks, night clubs, and other venues. A typical automated luminaire provides control from a remote location of the pan and tilt functions of the luminaire allowing an operator to control the direction the luminaire is pointing and thus the position of the light beam on the stage or in the studio. Often, this position control is done via control of the luminaire's position in two orthogonal rotational axes usually referred to as pan and tilt. Many automated luminaires additionally or alternatively provide control from the remote location of other parameters such as intensity, focus, zoom, beam size, beam shape, and/or beam pattern of light beam(s) emitted from the luminaire.

BRIEF DESCRIPTION OF THE DRAWINGS

For a more complete understanding of this disclosure, reference is now made to the following brief description, taken in conjunction with the accompanying drawings in which like reference numerals indicate like features.

SUMMARY

Figure 1:
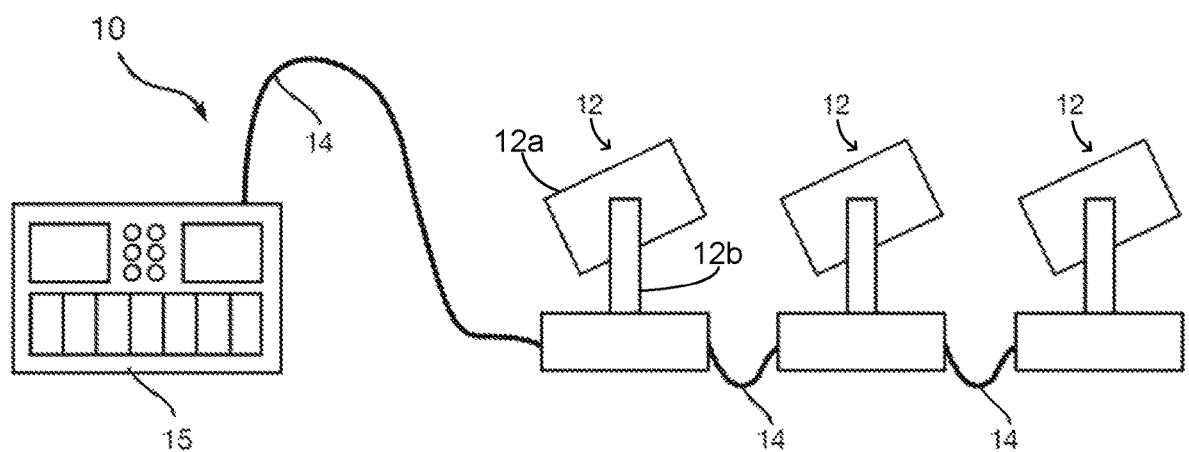
FIG. 1 presents a schematic view of a luminaire system according to the disclosure.

In a first embodiment, a luminaire includes a luminaire mechanism, a stepper motor, an absolute multi-turn rotational position sensing system, and a control system. The stepper motor has a motor shaft that is mechanically coupled to the luminaire mechanism. The stepper motor is configured to move the luminaire mechanism from a first position to a second position. The absolute multi-turn rotational position sensing system senses an absolute multi-turn position of the motor shaft and includes a first absolute rotational sensor and a second absolute rotational sensor. The first absolute rotational sensor detects an absolute rotational position of a cam indexer directly coupled to the motor shaft. The second absolute rotational sensor detects an absolute rotational position of an indexer wheel that is mechanically coupled to the cam indexer. The indexer wheel and cam indexer are configured to rotate the indexer wheel by a predetermined amount in response to one full rotation of the cam indexer. The control system is electrically coupled to a data link, the stepper motor, the first absolute rotational sensor, and the second absolute rotational sensor. The control system receives a first signal from the first absolute rotational sensor, where the first signal includes first information relating to the absolute rotational position of the cam indexer. The control system also receives a second signal from the second absolute rotational sensor, where the second signal includes second information relating to the absolute rotational position of the indexer wheel. The control system determines an absolute position of the luminaire mechanism based on the first information and the second information. The control system receives a luminaire mechanism command via the data link, where the luminaire mechanism command specifying a commanded position for the luminaire mechanism, and the control system causes the stepper motor to rotate to move the luminaire mechanism to the commanded position based on the absolute position of the luminaire mechanism.

In a second embodiment, a method of controlling a position of a luminaire mechanism of a luminaire includes detecting an absolute rotational position of a cam indexer that is directly coupled to a motor shaft of a stepper motor, where the motor shaft is mechanically coupled to a luminaire mechanism and moves the luminaire mechanism from a first position to a second position. The method also includes detecting an absolute rotational position of an indexer wheel that is mechanically coupled to the cam indexer, where the indexer wheel and the cam indexer are configured to rotate the indexer wheel by a predetermined amount in response to one full rotation of the cam indexer. The method further includes determining an absolute position of the luminaire mechanism based on the absolute rotational position of the cam indexer and the absolute rotational position of the indexer wheel. The method also includes receiving a luminaire mechanism command via a data link, where the luminaire mechanism command specifies a commanded position for the luminaire mechanism and causing the stepper motor to rotate to move the luminaire mechanism to the commanded position based on the absolute position of the luminaire mechanism.

In a third embodiment, an absolute multi-turn rotational position sensing system includes a first absolute rotational sensor and a second absolute rotational sensor. The absolute multi-turn rotational position sensing system senses an absolute position of a motor shaft of a stepper motor and a number of full rotations of the motor shaft. The first absolute rotational sensor detects an absolute rotational position of a cam indexer that is directly coupled to the motor shaft. The second absolute rotational sensor detects an absolute rotational position of an indexer wheel that is mechanically coupled to the motor shaft, where the indexer wheel is configured to rotate by a predetermined amount in response to one full rotation of the cam indexer.

DETAILED DESCRIPTION

Preferred embodiments are illustrated in the figures, like numerals being used to refer to like and corresponding parts of the various drawings.

A luminaire includes a luminaire mechanism, a stepper motor, an absolute multi-turn rotational position sensing system, and a control system. The stepper motor moves the luminaire mechanism from a first position to a second position. The absolute multi-turn rotational position sensing system includes absolute rotational sensors that detect absolute positions of (i) a cam indexer on the motor shaft and (ii) an indexer wheel coupled to the cam indexer. The indexer wheel rotates by a predetermined amount in response to one full rotation of the cam indexer. The control system determines an absolute position of the luminaire mechanism based on information from the absolute rotational sensors relating to the positions of the cam indexer and the indexer wheel. The control system receives a commanded position for the luminaire mechanism and causes the stepper motor to move the luminaire mechanism to the commanded position based on the absolute position of the luminaire mechanism.

FIG. 1 presents a schematic view of a luminaire system 10 according to the disclosure. The luminaire system 10 includes a plurality of luminaires 12 according to the disclosure. The luminaires 12 each contains on-board a light source, one or more of color changing systems, light modulation devices, and pan and/or tilt systems to control an orientation of a head of the luminaire 12. Mechanical drive systems to control parameters of the luminaire 12 include motors or other suitable actuators coupled to a control system, as described in more detail with reference to FIG. 2, which is configured to control the motors or other actuators.

The luminaire 12 includes a luminaire head 12a mounted in a yoke 12b. The yoke 12b rotates around a pan axis of rotation (vertical in the plane of the page in FIG. 1). The luminaire head 12a rotates within the yoke 12b around a tilt axis of rotation (perpendicular to the page in FIG. 1).

In addition to being connected to mains power either directly or through a power distribution system, the control system of each luminaire 12 is connected in series or in parallel by a data link 14 to one or more control desks 15. Upon actuation by an operator, the control desk 15 sends control signals (such as commands) via the data link 14, where the control signals are received by the control system of one or more of the luminaires 12. The control systems of the one or more of the luminaires 12 that receive the control signals may respond by changing one or more of the parameters of the receiving luminaires 12. The control signals are sent by the control desk 15 to the luminaires 12 using DMX-512, Art-Net, ACN (Architecture for Control Networks), Streaming ACN, or other suitable communication protocol.

The luminaire head 12a comprises an optical system comprising one or more luminaire mechanisms, each of which includes one or more optical devices such as gobo wheels, effects wheels, and color mixing (or other color changing) systems, as well as prism, iris, shutter, and lens movement systems. The term luminaire mechanisms further includes a pan mechanism configured to rotate the yoke 12b relative to a fixed portion of the luminaire 12 and a tilt mechanism configured to rotate the luminaire head 12a relative to the luminaire yoke 12b. Some or all of the luminaire mechanisms include stepper motors or other rotating actuators to cause movement of their associated optical device(s).

The stepper motors and/or rotating actuators of the luminaire 12 are electrically coupled to and under the control of the control system of the luminaire 12. Such luminaire mechanisms and their motors and/or actuators under the control of the control system of the luminaire 12 may be referred to as load movement systems. The control system of the luminaire 12 receives signals from the control desk 15 or other source via the data link 14. At least some of the signals include luminaire mechanism commands that comprise information identifying a luminaire mechanism and specifying a commanded position for the luminaire mechanism. In response to receipt of such command signals, the control system of the luminaire 12 moves the identified luminaire mechanism to the commanded position, using an absolute position sensing system according to the disclosure. In some embodiments, the data link 14 has a plurality of logical channels and the luminaire mechanism is identified by the identifier(s) of the logical channel(s) over which the luminaire mechanism command is received.

The luminaires 12 may include stepper motors to control the movement of the yoke, head, and/or internal optical systems. A stepper motor has a fixed number of full steps in each 360° full revolution, in some cases a stepper motor has 200 steps each of 1.8°, but other motors may have other numbers of full steps. The stepper motor can be moved through one or more of these full steps in either direction by a motion control system.

Absolute and incremental position control of a motor and its load may be understood through the example of an hour hand (a load) of a clock attached to the stepper motor. An incremental motion control system (IMCS) is able to move the clock hand by 30 degrees (or one hour on the clock face), but the IMCS does not know whether it has moved the clock hour hand from, for example, 1:00 to 2:00 or from 7:00 to 8:00. For a large or heavy clock hand, the motor axle might be coupled to the clock hand by a 2:1 belt drive system, where two full rotations of the motor axle are required to rotate the clock hand through 360 degrees (or one full rotation). For such a system, when the IMCS turns the motor through one full rotation, it knows that it has moved the clock hand through 180 degrees but it will not know whether it has moved the clock hand from, for example, 2:00 to 8:00 or from 9:00 to 3:00.

If a light sensor were placed in the clock face at the 12:00 position to signal the IMCS when the clock hand was blocking light to the sensor, the IMCS would be referred to as an indexed IMCS. The indexed IMCS can calibrate itself by rotating the clock hand until the signal is received from the sensor and, from that "index position," the indexed IMCS can reliably move the clock hand to 3:00 by rotating the motor by 180 degrees (rotating the clock hand by 90 degrees) in the clockwise direction from the index position and then to back to 1:00 by rotating the motor 120 degrees (rotating the clock hand by 90 degrees) in the counterclockwise direction from its 3:00 position.

Unlike a clock hand, which is able to rotate continuously about the clock face, some loads controlled by an indexed IMCS may have limits to the extent of the load's motion (e.g., a rotating load that only rotates through 270 degrees). The index position of such a load may be established by moving the load in a first direction into a limit switch, sensor (as above), a physical end stop, or other technique to reach a known physical position of the load. In some such indexed IMCSs, an opposite extent of motion (an opposite known position) is established by moving the load in an opposite direction into a second limit switch, sensor (as above), or a physical end stop.

Either a stepper motor or a servo motor may be used in an IMCS (or indexed IMCS). A stepper motor is inherently an indexed device, because it moves in steps of known size (known angle of rotation) in a known direction under the control of the IMCS. A servo motor is a free-running motor whose direction and rotational velocity is controlled by its MCS, which requires positional feedback on the motor or load to predictably control the position of the load. Where the feedback is provided by a position encoder that senses only increments of angular rotation, the servo MCS may be considered an incremental MCS.

In contrast, an absolute MCS (AMCS) has information that is available at startup relating the current physical position of the motor and/or load. Such an encoder may include a patterned object (e.g., a disc for a rotary encoder or a tape scale for a linear encoder) attached to the load and a sensor capable of reading the pattern currently under the sensor and unambiguously determining therefrom the current actual physical position of the load. Such patterned objects typically have fine-grained details to permit the sensor to read the current position to a high degree of accuracy. Either a stepper motor or a servo motor may be used in an AMCS.

In some stepper motor motion control systems, a stepper motor may be positioned between its full steps by using a technique called microstepping. The motion control system may cause the stepper motor to move to a static position (microstep) between two adjacent full steps by rapidly alternating power applied to the motor between the signal that would cause the motor to move to a first of the adjacent full steps and the signal that would cause the motor to move to a second of the adjacent full steps, allowing very precise positioning of the motor and luminaire mechanism. The duty cycle between the alternating steps controls a current microstep position of the motor between the two full steps. Unlike the incremental full steps of the stepper motor, the position of a microstep between the adjacent full steps is under absolute control of the motion control system and is determined by the duty cycle between the alternating steps, thus the motion control system reliably knows which microstep the motor is on between the adjacent full steps.

When used in an automated luminaire 12, the indexing process of an indexed IMCS described above may have disadvantages for the user: (i) the process may take a significant amount of time to perform, in some cases tens of seconds; (ii) the luminaire mechanism may be noisy while performing the process; and (iii), in the case of pan and tilt, the process may cause a significant amount of movement of the head as it rotates to its known fixed position(s). Similarly, an AMCS may have disadvantages: (i) the patterned object may have to be replaced if it is damaged by, for example, transport or rough handling of the luminaire 12, or (ii) the luminaire 12 may have to be partially disassembled for cleaning if the pattern becomes obscured by a buildup of dirt, oil, or other substances that may occur when the automated luminaire is used in harsh environments.

An absolute position sensing system according to the disclosure provides a method for determining an absolute position of a stepper motor and its associated load in an automated luminaire at startup without such disadvantages. In particular, an absolute position sensing system according to the disclosure requires little or no movement or time to establish the position of the stepper motor and its associated load.

Figure 2:
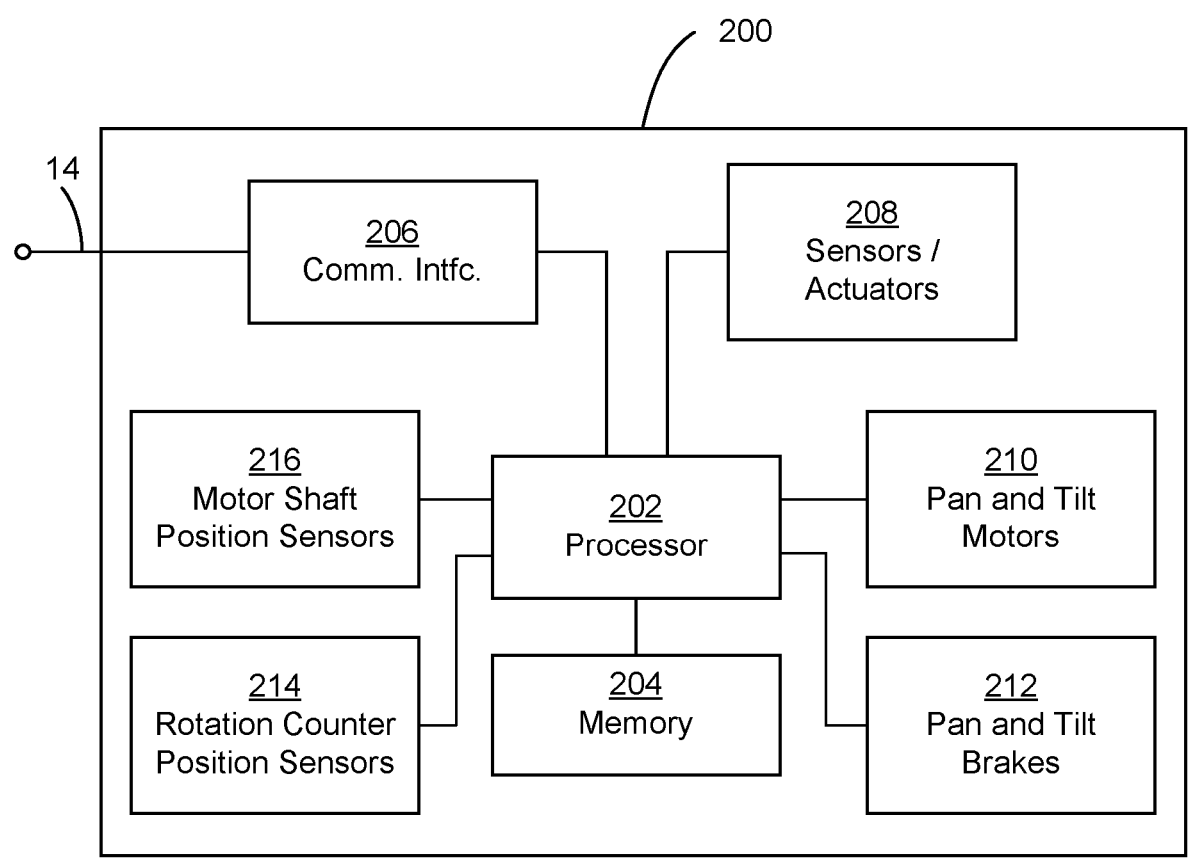
FIG. 2 presents a block diagram of a control system according to the disclosure.

FIG. 2 presents a block diagram of a control system (or controller) 200 according to the disclosure. The control system 200 is suitable for use to control the stepper motor movement systems of an automated luminaire according to the disclosure. The control system 200 is also suitable for controlling the light source, color changing devices, light modulation devices, pan and/or tilt systems, load movement systems, and other control functions of the luminaires 12.

The control system 200 includes a processor 202 electrically coupled to a memory 204. The processor 202 is implemented by hardware and software. The processor 202 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 202 is further electrically coupled to and in communication with a communication interface 206. The communication interface 206 is coupled to, and configured to communicate via, the data link 14. The processor 202 is also coupled via a control interface 208 to one or more sensors, motors, actuators, controls, and/or other devices. The processor 202 is configured to receive control signals from the data link 14 via the communication interface 206 and, in response, to control systems and mechanisms of the luminaire 12 via the control interface 208.

The processor 202 is further electrically coupled to and in communication with motors 210, optional motor brakes 212, motor rotation counter position sensors 214, and motor shaft position sensors 216. The processor 202 is configured to receive control signals from the data link 14 via the communication interface 206 and, in response, to control the motors 210 and the optional motor brakes 212, based on signals from the motor rotation counter position sensors 214 and the motor shaft position sensors 216, to control physical positions of systems and mechanisms (or loads) of the luminaire 12. In some embodiments, a value read from one of the motor rotation counter position sensors 214 is an absolute rotational position (in degrees or radians) of an indexer wheel (as described below) and may be converted into a number of complete rotations of a motor based on a number of teeth on the indexer wheel. In some embodiments, a value read from one of the motor shaft position sensors 216 is an absolute rotational position of the motor shaft (in degrees or radians) and may be converted into a step position of the motor based on a number of steps in one full rotation of the motor shaft.

The control system 200 is suitable for implementing processes, module control, optical device control, pan and tilt movement, parameter control, motor control, position sensor control, brake control, and other functionality as disclosed herein, which may be implemented as instructions stored in the memory 204 and executed by the processor 202. The memory 204 comprises one or more disks and/or solid-state drives and may be used to store instructions and data that are read and written during program execution. The memory 204 may be volatile and/or non-volatile and may be read-only memory (ROM), random access memory (RAM), ternary content-addressable memory (TCAM), and/or static random-access memory (SRAM).

Figure 3:
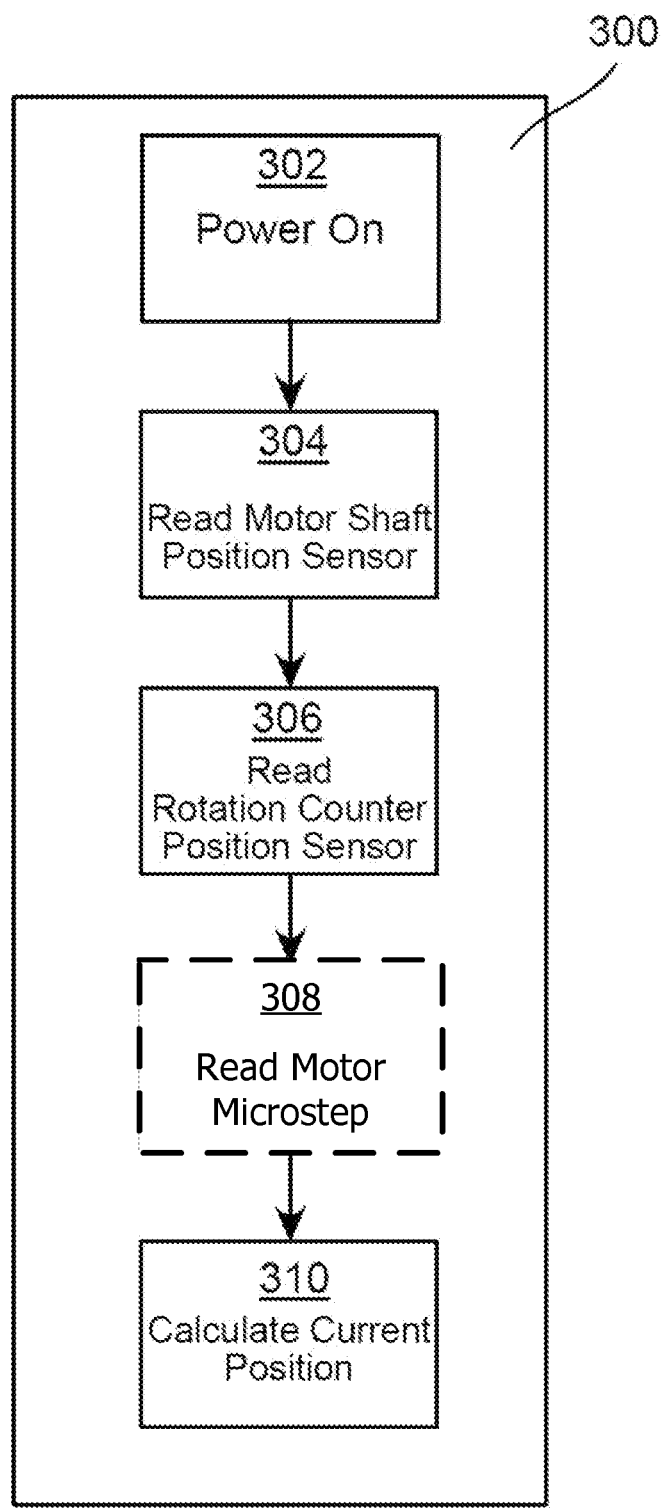
FIG. 3 presents a flow chart of a process according to the disclosure for establishing an absolute position of a load of an automated luminaire by determining an absolute position of a stepper motor associated with the load.

FIG. 3 presents a flow chart of a process 300 according to the disclosure for establishing an absolute position of a load of an automated luminaire by determining an absolute position of a stepper motor associated with the load. A stepper motor controlling, for example, pan movement of the luminaire 12 may have a geared or pulley driven connection to a load and thus the motor shaft may rotate multiple times while the load moves through its full range of motion. In some embodiments, a controller of the stepper motor has the capability of microstepping multiple smaller steps in between the full steps. These microsteps do not need additional sensing as they are controlled by a signal from the controller and, thus, the current microstep position is known to the controller.

The absolute position sensing system according to the disclosure takes into account these two (or three) parameters in order to determine a current absolute position of the load. The parameters are: an absolute rotational position of the stepper motor shaft, an absolute rotational position of a device indicating the rotation number that the motor shaft is on, and (optionally) a current microstep position. In steps of the process 300, after the luminaire 12 is powered up in step 302, the processor 202 reads the parameter values. The motor shaft position sensor 216 and the motor rotation counter position sensor 214 are physical sensors mechanically attached to the motor system, and their current values are read in steps 304 and 306 respectively. In optional step 308, where a control system provides microstepping control of the stepper motor, motor microstep information is read from the memory 204 or inferred from a high-resolution absolute rotational position of the cam indexer. The combination of the parameters' values (in some embodiments along with stored values such as gear ratios or pulley ratios) describes an absolute position of the stepper motor and enables the processor 202 to determine the current absolute position of the load, in step 310. The absolute position sensing system according to the disclosure is configured to make this determination at power up from an initial, static value of the absolute rotational position of the stepper motor shaft and an initial, static value of the motor rotation counter position, e.g., without requiring movement of the load in an indexing process as described above for an indexed IMCS or other movement of the load.

In an example, in a mechanism that moves a load through 540 degrees of rotation, using an 8:1 drive mechanism, the stepper motor will rotate 12 full rotations in moving the load through its full 540 degrees of rotation. Assume the motion control system creates 100 microsteps between pairs of full steps. In such a system one full motor rotation rotates the load through 540/8=67.5 degrees; one degree of motor shaft rotation rotates the load through 67.5/360=0.1875 degrees; and one microstep rotates the load through 0.1875/100=0.001875 degrees. Further assume (for simplicity of the example) that the motor rotation counter position value, motor shaft position value, and microstep value are all zero at one end of travel of the load. Under such assumptions, if the processor 202 reads a value of 13 degrees from the motor shaft position sensor 216, a value of 1 from the motor rotation counter position sensor 214, and has a stored microstep value of 33 (three values describing an absolute position of the stepper motor), the processor 202 determines that the load is at an absolute position of (1*67.5)+(13*0.1875)+(33*0.001875)=70 degrees from the end of travel position.

Figure 4:
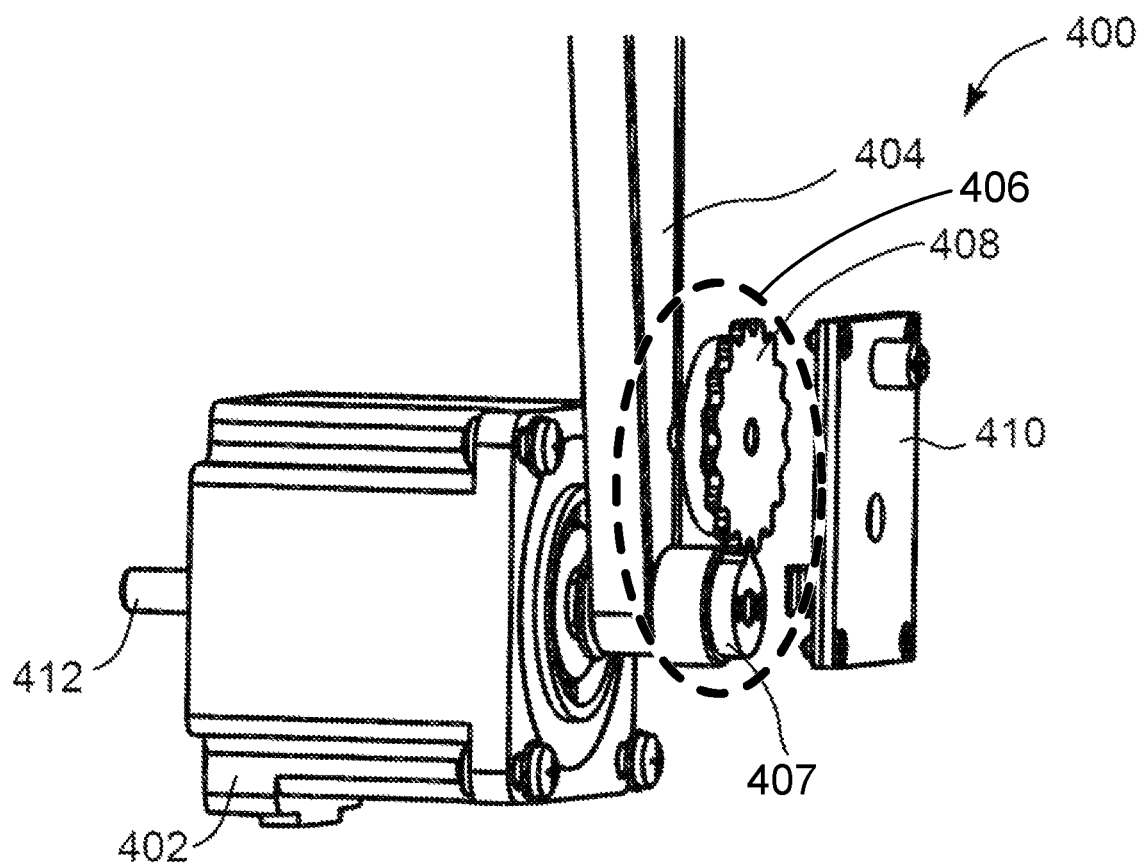
FIG. 4 presents an exploded view of a first absolute position sensing system according to the disclosure.

FIG. 4 presents an exploded view of a first absolute position sensing system 400 according to the disclosure. The first absolute position sensing system 400 comprises a rotary indexing system 406 and a sensor assembly 410. The rotary indexing system 406 comprises a cam indexer 407 and an indexer wheel 408. In other embodiments, other suitable rotary indexing systems may be used. The first absolute position sensing system 400 senses an absolute multi-turn rotational position of a stepper motor and is suitable for use in a tilt system (or other stepper-driven system) of the luminaire 12. A stepper motor 402 has a motor shaft 412 which protrudes from opposite sides of the stepper motor 402. In other embodiments, the motor shaft 412 may extend from only a single side of the stepper motor 402. One end of the motor shaft 412 is coupled to a drive belt 404 or to another suitable driving mechanism such as gears or a linear actuator. In other embodiments, for applications other than pan or tilt, the motor shaft 412 may be coupled to a linear actuator or other drive mechanism.

The same end of the motor shaft 412 is further directly coupled to the cam indexer 407. The cam indexer 407 comprises a gear having a single tooth. As the cam indexer 407 rotates through one complete rotation of the motor shaft 412, it moves the indexer wheel 408 through one tooth of rotation. The indexer wheel 408 is a gear mechanically coupled to the motor shaft 412 via the cam indexer 407 and configured to rotate by a predetermined amount in response to one full rotation of the motor shaft 412. As such, the rotational position of the indexer wheel 408 provides an indication of an integral number of full rotations of the motor shaft 412.

Absolute rotational positions of both the cam indexer 407 and the indexer wheel 408 are measured using sensors in the sensor assembly 410. These sensors may be magnetic, optical, mechanical, inductive, resistive or any other type of absolute position rotational sensor. The sensors may have a greater or lesser degree of resolution. For example, a sensor may read cam indexer position in steps or fractions of a step, or indexer wheel position in degrees or in fractions of a degree.

In the embodiment shown in FIG. 4, the sensors are magnetic. A first magnet is fixed to the center of cam indexer 407 and a second magnet to the center of indexer wheel 408. These magnets align with first and second magnetic sensors (not shown) of sensor assembly 410, which are configured to read the absolute positions of their associated magnets.

In some embodiments, one or both of the first and second magnets are two-pole diametric magnets with their magnetic poles oriented orthogonally to the axis of rotation of the cam indexer 407 or the indexer wheel 408. In other embodiments, one or both of the first and second magnets may be bar magnets mounted across an axis of rotation of the cam indexer 407 or the indexer wheel 408, with the magnetic pole of the bar magnet oriented orthogonal to its axis of rotation. In both such embodiments, the first and second magnetic sensors of the sensor assembly 410 may comprise magnetic rotary position sensors that produce an output signal representing an absolute rotational position of a two-pole magnet.

In some applications, the total movement of the yoke 12b in the pan direction is 540 degrees from a first end of travel to a second end of travel. In some such applications, gear ratios and pulley ratios require the motor shaft 412 to turn through 12 full rotations to move the yoke 12b through the full 540 degrees of rotation. Thus, the cam indexer 407 will make 12 full rotations and move the indexer wheel 408 by 12 teeth of rotation as the yoke 12b moves from its position at one end of travel to its position at the other end of travel. In such applications, the indexer wheel 408 is designed with at least 13 teeth, so that its absolute position of angular rotation at one end of travel is distinct from its absolute position of angular rotation at the other end of travel. In general, where the motor shaft 412 and the cam indexer 407 make n full rotations, the indexer wheel 408 is designed with at least n+1 teeth.

Figure 5:
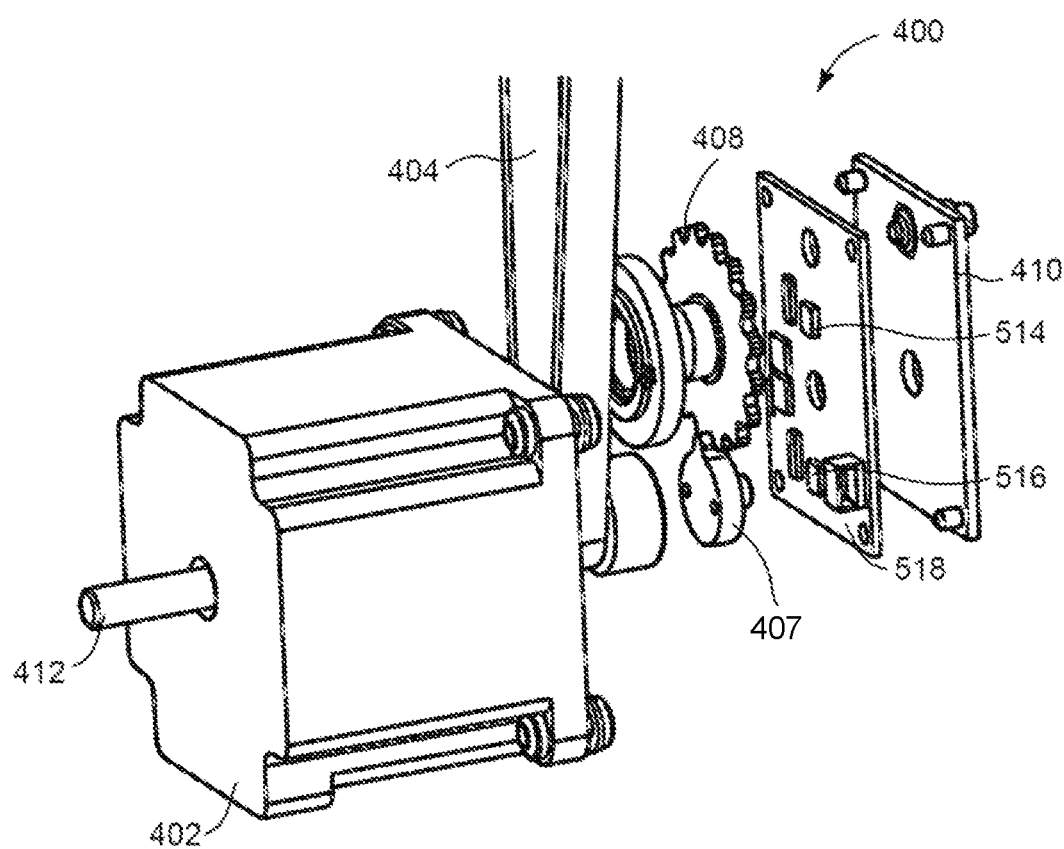
FIG. 5 presents a second exploded view of the first absolute position sensing system of FIG. 4.

FIG. 5 presents a second exploded view of the first absolute position sensing system 400 of FIG. 4. In this figure, rotated from the view in FIG. 4, it may be seen that the sensor assembly 410 includes a circuit board 518 that includes absolute rotational sensors 514 and 516. The absolute rotational sensor 516 detects an absolute rotational position of the cam indexer 407 (and thus the motor shaft 412) and the absolute rotational sensor 514 detects an absolute rotational position of the indexer wheel 408 (and is thus configured as a rotation counter position sensor of the number of complete rotations of the motor shaft 412). Although the absolute rotational sensors 514 and 516 are here shown mounted to a circuit board 518, the invention is not so limited and sensors 514 and 516 may be mounted to the structure of the luminaire or of the motor or another suitable mounting structure.

In some cases, a luminaire according to the disclosure is powered up for the first time after manufacture with one or more of the luminaire mechanisms in known mechanism positions. Where those one or more mechanisms have absolute position sensing systems according to the disclosure, the readings on the absolute rotational sensors 514 and 516 for each such mechanism may be recorded by the control system 200 as the rotation number of the motor shaft and the absolute rotational position of the motor shaft (respectively) corresponding to the known mechanism position.

If the luminaire according to the disclosure is powered up for the first time after manufacture with one or more of the luminaire mechanisms in unknown mechanism positions, then an indexing process as described above may be used to move the mechanisms into known positions. Then, the readings on the absolute rotational sensors 514 and 516 for each such mechanism may be recorded by the control system 200 as the rotation number of the motor shaft and the absolute rotational position of the motor shaft (respectively) corresponding to the known mechanism position.

Figure 6:
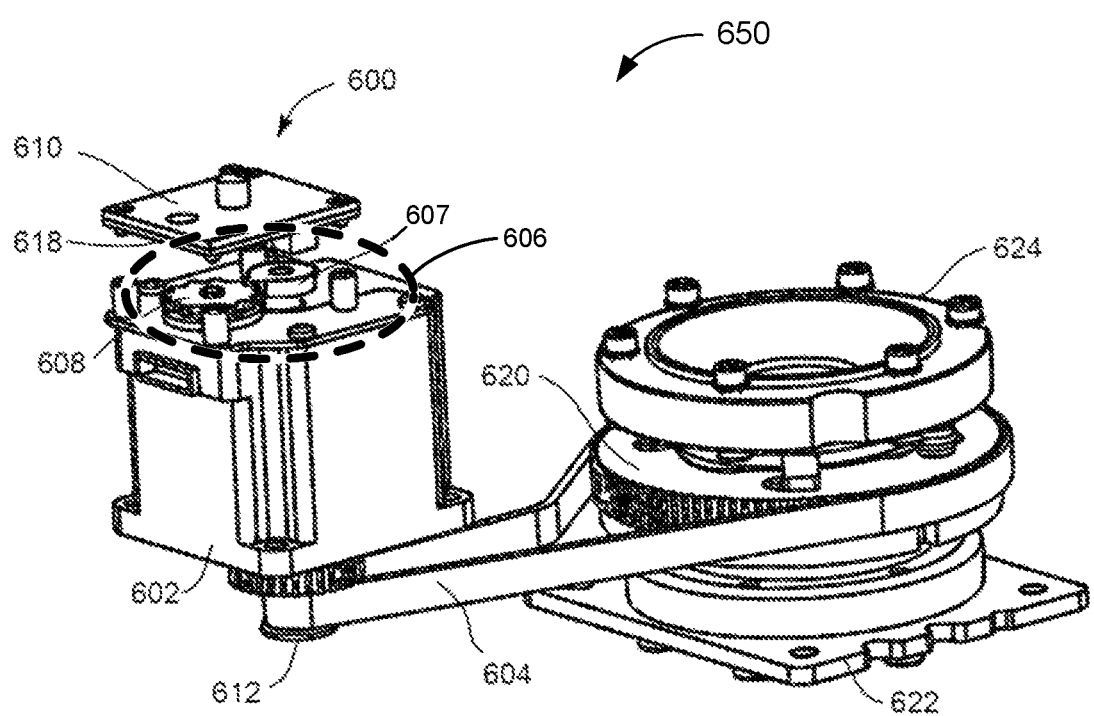
FIG. 6 presents an exploded view of a pan movement system including a second absolute position sensing system according to the disclosure.

FIG. 6 presents an exploded view of a pan movement system 650 including a second absolute position sensing system 600 according to the disclosure. The second absolute position sensing system 600 comprises a rotary indexing system 606 and a sensor assembly 610. The rotary indexing system 606 comprises a cam indexer 607 and an indexer wheel 608. The second absolute position sensing system 600 senses an absolute multi-turn rotational position of a stepper motor and is suitable for use in a pan system (or other stepper-driven system) of the luminaire 12. A stepper motor 602 includes a motor shaft 612 which has first and second ends protruding from opposite sides of the stepper motor 602. The first end of the motor shaft 612 is coupled to a drive belt 604 (or to another driving mechanism such as gears). In other embodiments, for applications other than pan or tilt, the motor shaft 612 may be coupled to a linear actuator or other drive mechanism. The drive belt 604 drives a pan gear 620 which is fixedly coupled to a head coupling 624 which is rotatably coupled to a chassis 622. The second, opposing end of the motor shaft 612 is coupled to the cam indexer 607 and thereby to the indexer wheel 608. Absolute rotational positions of both the cam indexer 607 and the indexer wheel 608 are measured using sensors in the sensor assembly 610, which includes a circuit board 618.

Figure 7:
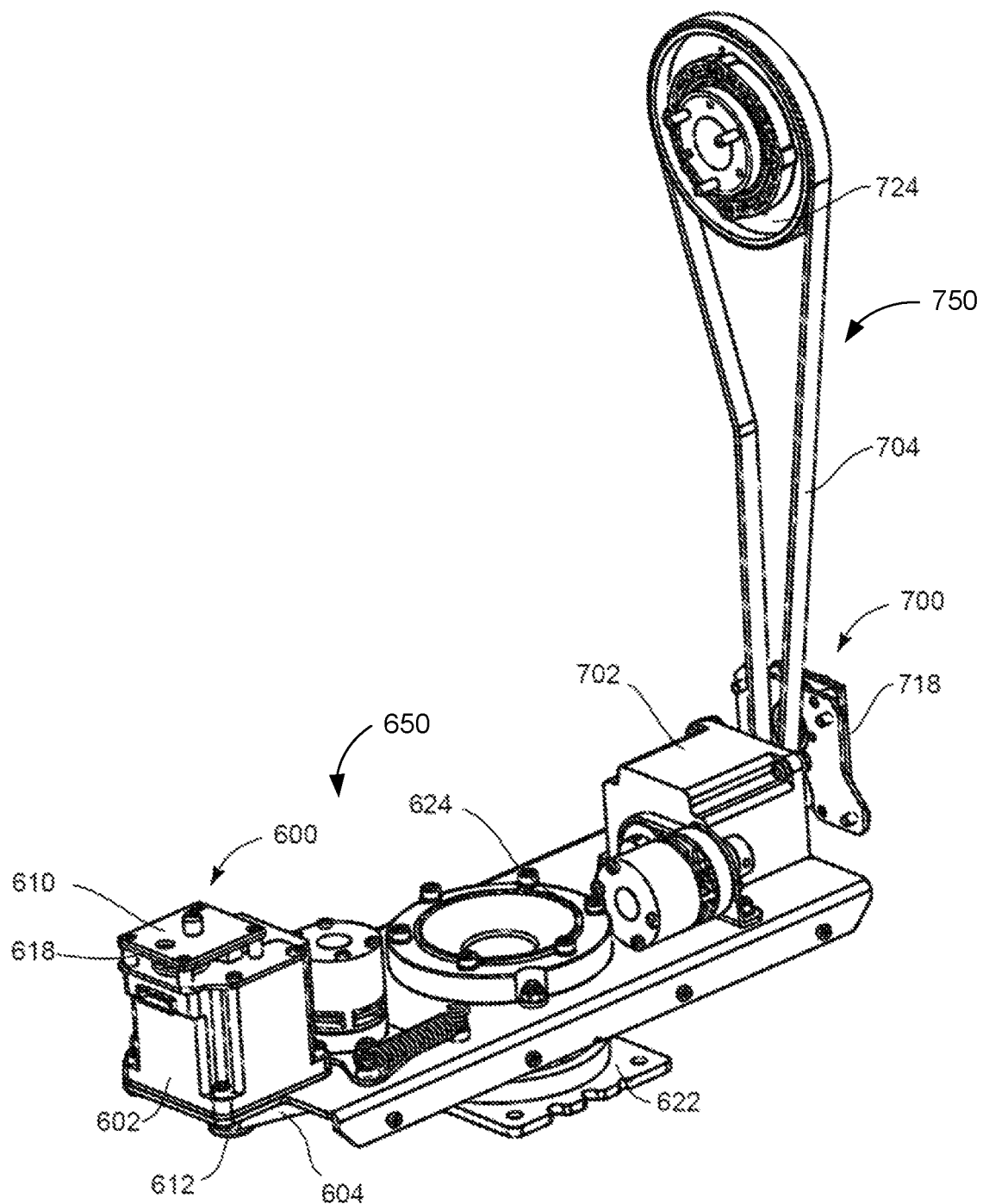
FIG. 7 presents an isometric view of a pan movement system and tilt movement system of an automated luminaire, including absolute position sensing systems according to the disclosure.

FIG. 7 presents an isometric view of a pan movement system 650 and tilt movement system 750 of the luminaire 12, including absolute position sensing systems according to the disclosure. As shown in FIG. 6, the stepper motor 602 drives the pan movement of the yoke 12*b* (and thereby the luminaire head 12*a*) of the luminaire 12 through head coupling 624 and utilizes the second absolute position sensing system 600 to determine absolute rotational positions of both the motor shaft 612 (via the cam indexer 607) and the indexer wheel 608 (neither is shown in FIG. 7). Similarly, a tilt stepper motor 702 drives the tilt movement of the luminaire head 12*a* of the luminaire 12 through a drive belt 704 (or another driving mechanism such as gears) and a coupling 724 and utilizes an absolute position sensing system 700, which includes a circuit board 718, to determine absolute rotational positions of both a shaft of the tilt stepper motor 702 and an associated indexer wheel (not shown) within the absolute position sensing system 700. The absolute position sensing system 700 is coupled to the same end of the shaft of the tilt stepper motor 702 as the tilt driving gear, while the second absolute position sensing system 600 is coupled to the opposite end of the motor shaft 612 of the stepper motor 602 than the pan driving gear. In practice the absolute position sensing systems may be connected to either end of the motor shaft or may instead be connected through gears or drive belts to an ancillary pulley or shaft.

Figure 8:
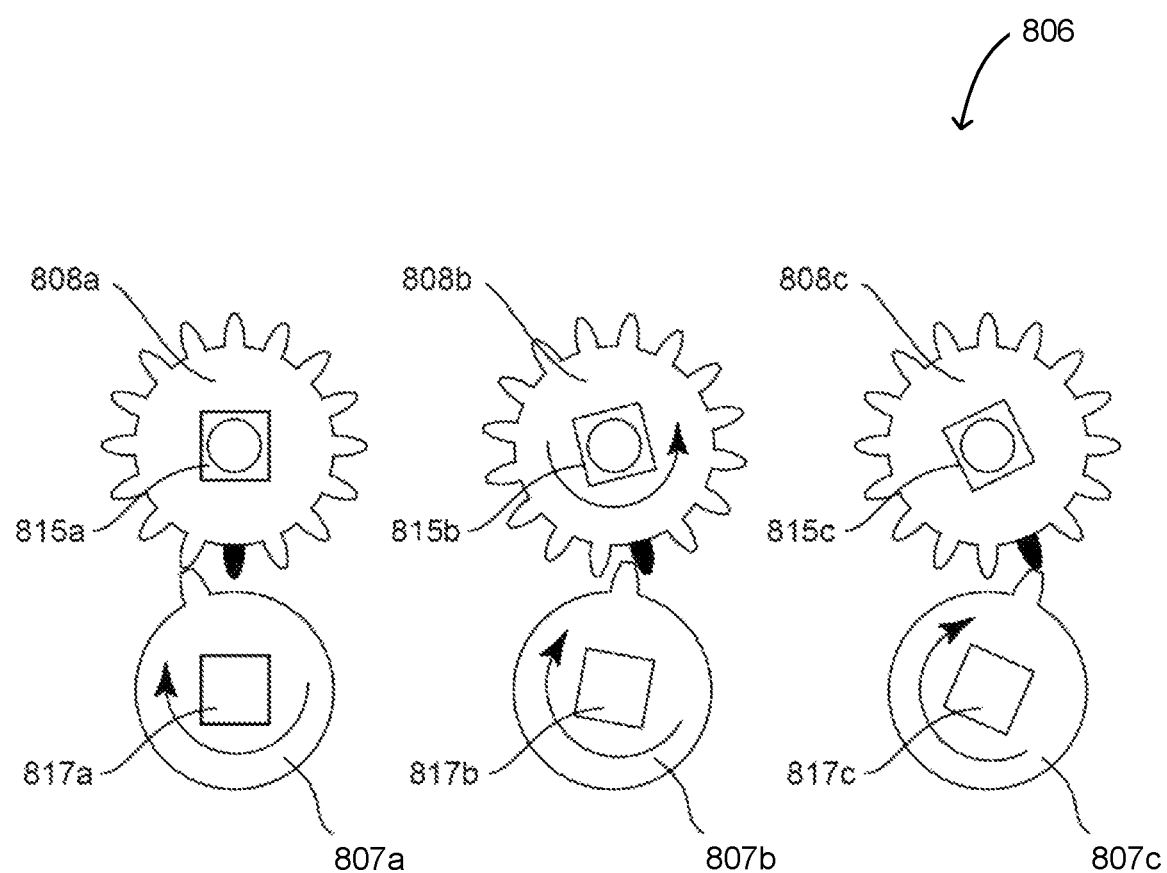
FIG. 8 presents a schematic view of a rotary indexing system for motor shaft rotation counting according to the disclosure.

FIG. 8 presents a schematic view of a rotary indexing system 806 for motor shaft rotation counting according to the disclosure. The rotary indexing system 806 is suitable for use in the absolute position sensing systems of FIGS. 4-7. The rotary indexing system 806 includes a cam indexer 807 and an indexer wheel 808. FIG. 8 shows three sequential positions of the cam indexer 807 (807*a*, 807*b*, and 807*c*) and the indexer wheel 808 (808*a*, 808*b*, and 808*c*) as the cam indexer 807 rotates while coupled to a motor shaft. The single tooth on the cam indexer 807 in position 807*a* is moving towards a currently active tooth (shown colored black) on the indexer wheel 808 in position 808*a*. The tooth of the cam indexer 807 in position 807*b* has contacted the currently active tooth on the indexer wheel 808 in position 808*b* and is rotating the indexer wheel 808. The tooth of the cam indexer 807 in position 807*c* is exiting contact with the currently active tooth on the indexer wheel 808 in position 808*c* and thus the indexer wheel 808*c* stops rotating, having turned through one tooth of rotation. An absolute rotational sensor (e.g., 516) senses an absolute rotational position of the cam indexer 807 by sensing a rotational position (817*a*, 817*b*, and 817*c*) of a magnet 817 that is fixedly coupled to the cam indexer 807. Similarly, an absolute rotational sensor (e.g., 514) senses an absolute rotational position of the indexer wheel 808 by sensing rotational position (815*a*, 815*b*, and 815*c*) of a magnet 815 that is fixedly coupled to the indexer wheel 808.

An indexer wheel of the disclosure moves incrementally from one position to the next during a portion of the rotation of the motor shaft (in these embodiments, by the action of the single tooth of the cam indexer) and remains static during the remainder of one full rotation of the motor shaft. The indexer wheel does not rotate continuously along with the motor shaft, but rather indexes (or incrementally rotates) to a new position only as the motor shaft rotates through a portion of its rotation. In the example shown in FIG. 8, it may be seen that the indexer wheel 808, having 16 teeth, moves 22.5 degrees for each full rotation of the cam indexer 807 (motor shaft). Thus, the indexer wheel 808 moves only during approximately 22.5 degrees of rotation of the cam indexer 807, i.e., while the single tooth of the cam indexer 807 is in contact with the currently active tooth of the indexer wheel 808. The indexer wheel 808 remains static during the remaining 337.5 degrees of rotation of the motor shaft and the cam indexer 807. While the embodiment of the present disclosure comprises a single-tooth cam indexer and a multi-tooth indexer wheel, in other embodiments other suitable mechanisms may be used that provide incremental rotation of an indexer wheel once per full rotation of a motor shaft.

Figure 9:
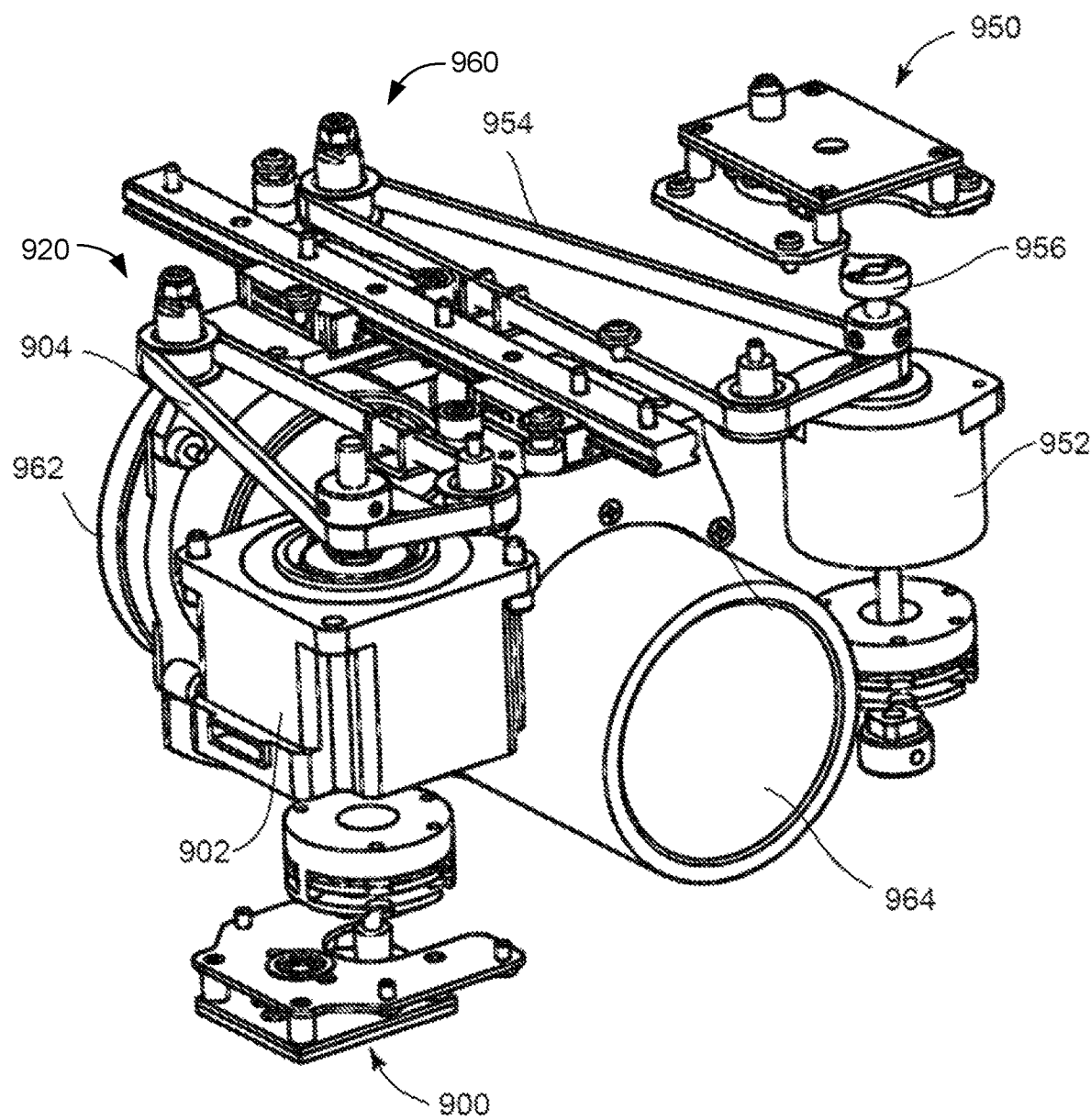
FIG. 9 presents a view of focus and zoom movement systems of the automated luminaire according to the disclosure.

Use of the disclosed absolute rotational position sensing system is not limited to the pan and tilt systems of an automated luminaire and may be used for any of its motorized movement and optical functions. FIG. 9 presents a view of a focus movement system 920 and zoom movement system 960 of the luminaire 12. The focus movement system 920 includes an absolute position sensing system 900 according to the disclosure, a stepper motor 902, and a belt system 904. The stepper motor 902 drives movement of a lens 964 through the belt system 904 to focus a light beam projected by the luminaire 12, and the absolute position sensing system 900 determines absolute rotational positions of both a cam indexer (not shown) and an indexer wheel (not shown). Similarly, a stepper motor 952 drives movement of a lens carriage 962 through a belt system 954 to change a beam angle of a light beam projected by the luminaire 12, and the absolute position sensing system 950 determines absolute rotational positions of both a cam indexer 956 and an indexer wheel (not shown).

The pan movement system 650 of FIGS. 6 and 7, the tilt movement system 750 of FIG. 7, the focus movement system 920, and the zoom movement system 960 of FIG. 9, under the control of the control system 200, disclose embodiments of load movement systems according to the disclosure. In a load movement system according to the disclosure, an absolute multi-turn rotational position sensing system for sensing an absolute position of a motor shaft of the load movement system provides information allowing the control system 200 to determine an absolute position of the load.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire comprising:
a luminaire mechanism;
a stepper motor having a motor shaft mechanically coupled to the luminaire mechanism and configured to move the luminaire mechanism from a first position to a second position;
an absolute multi-turn rotational position sensing system for sensing an absolute multi-turn position of the motor shaft, the absolute multi-turn rotational position sensing system comprising:
a first absolute rotational sensor configured to detect an absolute rotational position of a cam indexer directly coupled to the motor shaft, the cam indexer comprising a first gear with a single tooth; and
a second absolute rotational sensor configured to detect an absolute rotational position of an indexer wheel mechanically coupled to the cam indexer, the cam indexer comprising a second gear with a plurality of teeth, the single tooth of the cam indexer being configured to contact the teeth of the indexer wheel to rotate the indexer wheel by a predetermined amount in response to one full rotation of the cam indexer; and
a control system electrically coupled to a data link, the stepper motor, the first absolute rotational sensor, and the second absolute rotational sensor, the control system configured to:
receive a first signal from the first absolute rotational sensor, the first signal comprising first information relating to the absolute rotational position of the cam indexer;
receive a second signal from the second absolute rotational sensor, the second signal comprising second information relating to the absolute rotational position of the indexer wheel;
determine an absolute position of the luminaire mechanism based on the first information and the second information;
receive a luminaire mechanism command via the data link, the luminaire mechanism command specifying a commanded position for the luminaire mechanism; and
cause the stepper motor to rotate to move the luminaire mechanism to the commanded position based on the absolute position of the luminaire mechanism.

2. The luminaire of claim 1, wherein:
the first absolute rotational sensor is configured to detect an initial, static absolute rotational position of the cam indexer at power up of the luminaire; and
the second absolute rotational sensor is configured to detect an initial, static absolute rotational position of the indexer wheel at power up of the luminaire.

3. The luminaire of claim 1, wherein the control system is further configured to:
cause the stepper motor to rotate to move the luminaire mechanism to a microstep position between two adjacent full steps of the stepper motor, the microstep position based on the commanded position.

4. The luminaire of claim 3, wherein the control system is further configured to:
read microstep information from a memory, the microstep information relating to a current microstep position of the stepper motor; and
determine the absolute position of the luminaire mechanism based on the first information and the second information and further on the microstep information.

5. The luminaire of claim 1, wherein:
the cam indexer comprises a first magnet and the first absolute rotational sensor comprises a first magnetic rotary position sensor configured to detect an absolute rotational position of the first magnet; and
the indexer wheel comprises a second magnet and the second absolute rotational sensor comprises a second magnetic rotary position sensor configured to detect an absolute rotational position of the second magnet.

6. The luminaire of claim 1, wherein:
the luminaire mechanism has a first end of travel and a second end of travel;
the mechanical coupling of the motor shaft to the luminaire mechanism is configured to cause the motor shaft to complete n full rotations to move the luminaire mechanism from the first end of travel to the second end of travel; and
the plurality of teeth comprises at least n+1 teeth.

7. The luminaire of claim 1, wherein the mechanical coupling of the luminaire mechanism to the motor shaft comprises a belt drive.

8. The luminaire of claim 1, wherein the luminaire mechanism comprises one of a pan mechanism, a tilt mechanism, and a lens movement system.

9. A method of controlling a position of a luminaire mechanism of a luminaire, the method comprising:
    detecting an absolute rotational position of a cam indexer directly coupled to a motor shaft of a stepper motor, the motor shaft mechanically coupled to a luminaire mechanism and configured to move the luminaire mechanism from a first position to a second position;
    detecting an absolute rotational position of an indexer wheel mechanically coupled to the cam indexer, the cam indexer configured to contact teeth of the indexer wheel with a single tooth of the cam indexer to rotate the indexer wheel by a predetermined amount in response to one full rotation of the cam indexer;
    determining an absolute position of the luminaire mechanism based on the absolute rotational position of the cam indexer and the absolute rotational position of the indexer wheel;
    receiving a luminaire mechanism command via a data link, the luminaire mechanism command specifying a commanded position for the luminaire mechanism; and
    causing the stepper motor to rotate to move the luminaire mechanism to the commanded position based on the absolute position of the luminaire mechanism.

10. The method of claim 9, wherein:
    detecting an absolute rotational position of the cam indexer comprises detecting an initial, static absolute rotational position of the cam indexer at power up of the luminaire; and
    detecting an absolute rotational position of the indexer wheel comprises detecting an initial, static absolute rotational position of the indexer wheel at power up of the luminaire.

11. The method of claim 10, wherein:
    the cam indexer comprises a first magnet and detecting an absolute rotational position of the cam indexer comprises receiving a first signal from a first magnetic rotary position sensor configured to detect an absolute rotational position of the first magnet; and
    the indexer wheel comprises a second magnet and detecting an absolute rotational position of the indexer wheel comprises receiving a second signal from a second magnetic rotary position sensor configured to detect an absolute rotational position of the second magnet.

12. The method of claim 10, wherein the luminaire mechanism comprises one of a pan mechanism, a tilt mechanism, and a lens movement system.

13. The method of claim 9, further comprising:
    causing the stepper motor to rotate to move the luminaire mechanism to a microstep position between two adjacent full steps of the stepper motor, the microstep position based on the commanded position.

14. The method of claim 13, further comprising:
    reading microstep information from a memory, the microstep information relating to a current microstep position of the stepper motor; and
    determining the absolute position of the luminaire mechanism based on the absolute rotational position of the cam indexer and the absolute rotational position of the indexer wheel and further on the microstep information.

15. An absolute multi-turn rotational position sensing system for sensing an absolute position of a motor shaft of a stepper motor and a number of full rotations of the motor shaft, the absolute multi-turn rotational position sensing system comprising:
    a first absolute rotational sensor configured to detect an absolute rotational position of a cam indexer directly coupled to the motor shaft; and
    a second absolute rotational sensor configured to detect an absolute rotational position of an indexer wheel mechanically coupled to the cam indexer, the indexer wheel configured to rotate by a predetermined amount in response to one full rotation of the cam indexer, wherein
    the indexer wheel is mechanically coupled to the motor shaft via the cam indexer, the cam indexer configured to cause the indexer wheel to rotate by the predetermined amount in response to one full rotation of the cam indexer, and
    the cam indexer comprises a first gear with a single tooth and the indexer wheel comprises a second gear with a plurality of teeth, the single tooth of the cam indexer being configured to contact the teeth of the indexer wheel.

16. The absolute multi-turn rotational position sensing system of claim 15, wherein:
    the first absolute rotational sensor is configured to detect an initial, static absolute rotational position of the cam indexer at power up of the absolute multi-turn rotational position sensing system; and
    the second absolute rotational sensor is configured to detect an initial, static absolute rotational position of the indexer wheel at power up of the absolute multi-turn rotational position sensing system.

17. The absolute multi-turn rotational position sensing system of claim 15, wherein:
    the cam indexer comprises a first magnet and the first absolute rotational sensor comprises a first magnetic rotary position sensor configured to detect an absolute rotational position of the first magnet; and
    the indexer wheel comprises a second magnet and the second absolute rotational sensor comprises a second magnetic rotary position sensor configured to detect an absolute rotational position of the second magnet.

18. The absolute multi-turn rotational position sensing system of claim 15, wherein:
    the motor shaft is further mechanically coupled to a load having a first end of travel and a second end of travel;
    the mechanical coupling of the motor shaft to the load is configured to cause the motor shaft to complete n full rotations to move the load from the first end of travel to the second end of travel; and
    the plurality of teeth comprises at least n+1 teeth.

19. The absolute multi-turn rotational position sensing system of claim 18, wherein:
    the motor shaft comprises a first end and a second end;
    the cam indexer is mechanically coupled to the first end of the motor shaft; and
    the load is mechanically coupled to the second end of the motor shaft.

* * * * *